United States Patent
Ratts et al.

(10) Patent No.: US 12,006,856 B1
(45) Date of Patent: Jun. 11, 2024

(54) AFTERTREATMENT FOR ALCOHOL FUEL SUBSTITUTED DIESEL ENGINES

(71) Applicant: Caterpillar Inc., Peoria, IL (US)

(72) Inventors: Joshua Lynn Ratts, Pine Village, IN (US); Abhay Gupta, Peoria Heights, IL (US); Arnold Myoungjin Kim, Peoria, IL (US); Eric Lee Schroeder, Germantown Hills, IL (US); Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/319,239

(22) Filed: May 17, 2023

(51) Int. Cl.
| | |
|---|---|
| *F01N 3/20* | (2006.01) |
| *B01D 53/94* | (2006.01) |
| *F01N 3/10* | (2006.01) |
| *F01N 3/28* | (2006.01) |

(52) U.S. Cl.
CPC ......... *F01N 3/208* (2013.01); *B01D 53/9431* (2013.01); *B01D 53/9477* (2013.01); *B01D 53/9495* (2013.01); *F01N 3/106* (2013.01); *F01N 3/2803* (2013.01); *F01N 3/2892* (2013.01); *B01D 2251/2062* (2013.01); *B01D 2255/102* (2013.01); *B01D 2255/904* (2013.01); *F01N 2370/02* (2013.01); *F01N 2610/03* (2013.01); *F01N 2610/05* (2013.01); *F01N 2900/1402* (2013.01)

(58) Field of Classification Search
CPC ........ F01N 3/106; F01N 3/2066; F01N 3/208; F01N 2610/02
See application file for complete search history.

(56) References Cited

U.S. PATENT DOCUMENTS

| | | | |
|---|---|---|---|
| 10,857,529 | B2 | 12/2020 | Patchett et al. |
| 2007/0231229 | A1 | 10/2007 | Rae et al. |
| 2009/0277159 | A1* | 11/2009 | Driscoll ............ B01D 53/9495 |
| | | | 423/239.1 |
| 2010/0050604 | A1 | 3/2010 | Hoard et al. |
| 2016/0326930 | A1* | 11/2016 | Umemoto ........... F01N 13/0097 |
| 2018/0010500 | A1* | 1/2018 | Döring .................. F01N 3/2066 |
| 2019/0162091 | A1 | 5/2019 | Banno et al. |
| 2020/0149453 | A1* | 5/2020 | Döring ................ F02D 41/0027 |
| 2021/0156321 | A1 | 5/2021 | Yao et al. |
| 2021/0270166 | A1* | 9/2021 | Woog .................... F01N 3/0885 |

FOREIGN PATENT DOCUMENTS

| | | |
|---|---|---|
| CN | 204436625 U | 7/2015 |
| CN | 211975165 U | 11/2020 |

* cited by examiner

*Primary Examiner* — Jonathan R Matthias
(74) *Attorney, Agent, or Firm* — Lee & Hayes, P.C.

(57) ABSTRACT

An internal combustion engine system is described herein. The system uses an additive added to the exhaust of the internal combustion engine to maintain a range of NO2 to NO within a range that provides for a fast SCR reaction in a selective catalyst reduction unit. The additive and the exhaust enter a diesel oxidation catalyst (DOC), whereby the NO2 undergoes a two-stage process. In the first stage, the NO2 from the exhaust is adsorbed onto the precious metal catalyst of the DOC and an atomic oxygen is removed from the NO2, reducing the NO2 to NO. Because of the higher reactivity of the additive, the additive scavenges a portion of the atomic oxygen from the catalyst. During the second stage of the DOC process, the NO is oxidized over the catalyst to form NO2.

7 Claims, 4 Drawing Sheets

AFTERTREATMENT FOR ALCOHOL FUEL SUBSTITUTED DIESEL ENGINES

TECHNICAL FIELD

The present disclosure relates to internal combustion engines, and more particularly, to using an aftertreatment system to reduce the emission of nitrogen oxides (NOx) from a diesel engine that uses an alcohol as a substituted fuel.

BACKGROUND

Internal combustion engines are widely used in various industries. Internal combustion engines can operate on a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. In an attempt to reduce greenhouse gases (GHG), some endeavors have been made to change the primary fuel used in combustions engines from fuels such as diesel to alcohol fuels such as ethanol and methanol, or combinations of these fuels. When alcohol-based fuels, or other oxygenated fuels, are used with diesel fuels, the amount of nitrogen dioxide (NO2) can significantly increase. NO2 can be considered a pollutant due to its effect on humans. Further, NO2 can contribute to the formation and modification of other pollutants such as ozone, particulate matter, as well as acid rain.

Some efforts have been made to reduce the amount of NO2 produced in a diesel engine that uses an alcohol fuel, such as methanol. For example, U.S. Patent Application Publication No. 20210156321 to Yao et. al ("the '321 application") describes one such effort. The '321 application describes the use of an ignition delay to change the thermodynamic and chemical properties of the diesel/methanol fuel mixture in a combustion chamber. The '321 application describes using a "long ignition delay period of diesel oil" that "will allow a long enough time for diesel oil to be fully atomized and to form highly active combustible mixture with methanol-air mixture." The '321 application states that a reduced level of nitric oxide (NO) and nitrogen dioxide (NO2), or (NOx), emissions are achieved because, among other reasons, the extended ignition delay period of diesel oil reduced the local equivalence ratio of diesel oil, reducing cylinder temperature and the duration of combustion. However, the system (and process) described in the '321 application suffers from some shortfalls. For example, the system of the '321 application causes a significant change in the thermal properties of the engine, potentially requiring additional construction considerations of the engine to handle those changes. Additionally, because of the change of the combustion cycle (e.g., lower temperatures, shorter combustion time, and the like), the timing, fuel system, ignition modules, and other components that control combustion in the engine may need to be changed or modified.

Some examples of the present disclosure are directed to overcoming these and other deficiencies of such systems.

SUMMARY

One aspect of the presently disclosed subject matter describes an internal combustion engine system having an internal combustion engine configured to combust diesel fuel and a second fuel, wherein a portion of an exhaust of the combustion engine comprises nitrogen dioxide (NO2) and nitric oxide (NO), a diesel oxidation catalyst (DOC) configured to receive the exhaust of the internal combustion engine and, in a first stage, decrease a concentration of the NO2 at a first concentration to a second concentration using an additive and reducing a portion of the NO2 to NO and, in a second stage, increase the concentration of the NO2 from the second concentration to a third concentration by oxidizing a portion of the NO to NO2, wherein the third concentration of the NO2 is less than the first concentration, and a selective catalytic reduction (SCR) system configured to receive the NO2 and NO from the DOC and react the NO2 and NO with anhydrous ammonia (NH3) to produce nitrogen and water as an emission from the internal combustion engine system.

In another aspect, the presently disclosed subject matter describes a controller for controlling emissions of an internal combustion engine system, with the controller comprising a memory storing computer-executable instructions, and a processor in communication with the memory, the computer-executable instructions causing the processor to perform acts comprising receiving data from a detector measuring an exhaust gas created by a combustion of a first fuel and a second fuel, calculating a concentration of NO2 in the exhaust gas, determining if a ratio of the NO2 to NO is within a range, and upon determining that the ratio of the NO2 to NO is above the range, increasing an amount of an additive into a diesel oxidation catalyst (DOC), wherein the DOC receives the exhaust gas, upon determining that the ratio of the NO2 to NO is at or within the range, maintaining the amount of the additive into the DOC, or upon determining that the ratio of the NO2 to NO is below the range, decreasing the amount of the additive into the DOC.

In a still further aspect, the presently disclosed subject matter describes a method of controlling emissions of an internal combustion engine, the method comprising receiving detector data of an exhaust of the internal combustion engine created by a combustion of a first fuel and a second fuel in the internal combustion engine, wherein a portion of the exhaust comprises nitrogen dioxide (NO2) and nitric oxide (NO), using the detector data, calculating NO2 concentration in the exhaust, determining that the NO2 concentration is above a range; and increasing an amount of an additive entering a diesel oxidation catalyst (DOC) receiving the exhaust, wherein the DOC is configured to in a first stage, decrease the concentration of the NO2 at a first concentration to a second concentration using the additive and reducing a portion of the NO2 to NO, and in a second stage, increase the concentration of the NO2 from the second concentration to a third concentration by oxidizing a portion of the NO to NO2, wherein the third concentration of the NO2 is less than the first concentration.

DETAILED DESCRIPTION

Figure 1:
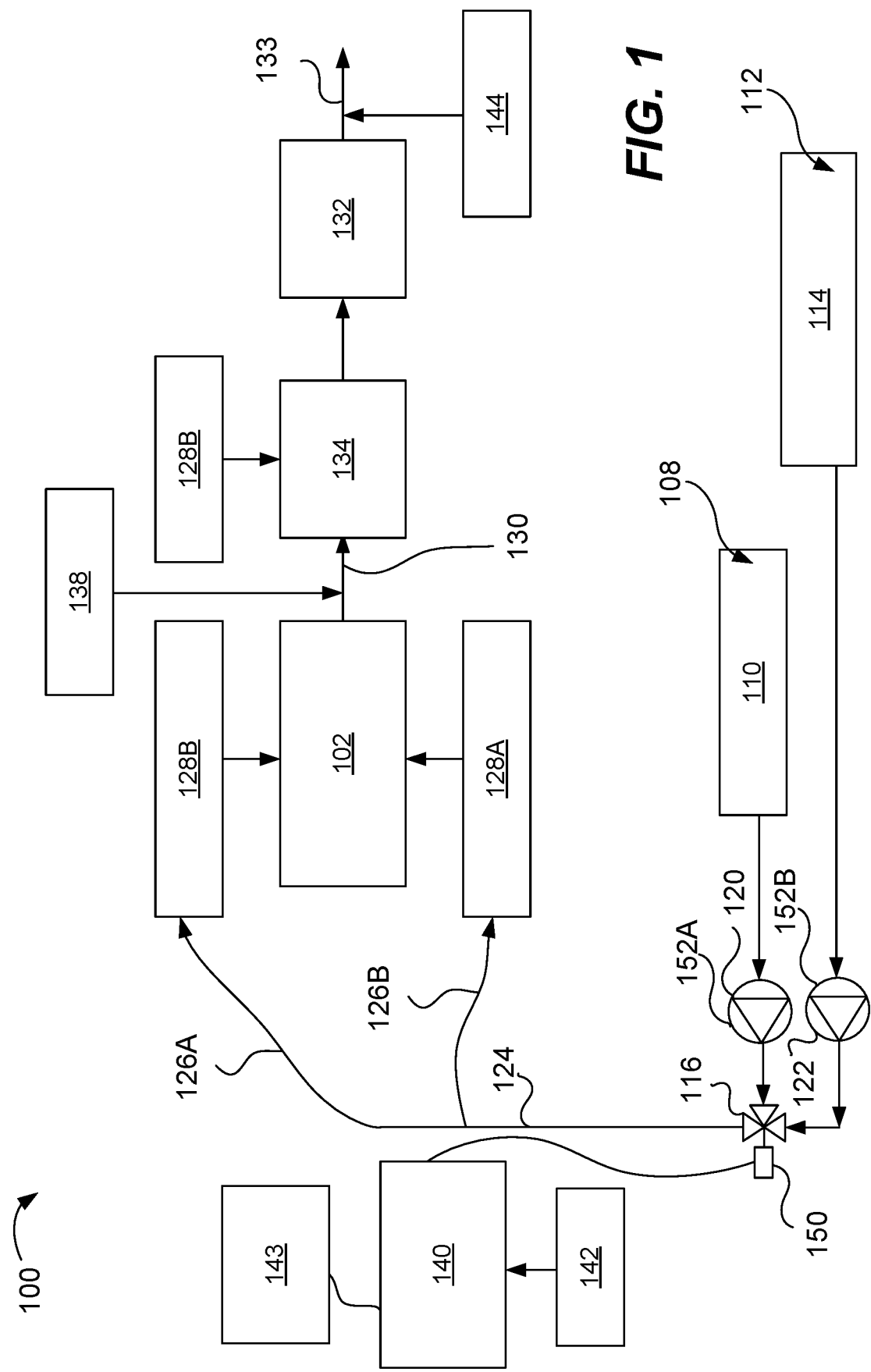
FIG. 1 illustrates an internal combustion engine system configured to control emissions, in accordance with various embodiments of the presently disclosed subject matter.

Wherever possible, the same reference numbers will be used throughout the drawings to refer to the same or like parts. FIG. 1 illustrates an internal combustion engine system 100 configured to control emissions, in accordance with various embodiments of the presently disclosed subject matter. The internal combustion engine system 100 includes an internal combustion engine 102 with a plurality of combustion cylinders (not shown). The internal combustion engine 102 may have any number of combustion cylinders. It will be understood that the combustion cylinders are associated with a piston (not shown) movable between a top dead center position and a bottom dead center position in a generally conventional manner, typically in a four-stroke engine cycle, though other combustion cycles may be used and are considered to be within the scope of the presently disclosed subject matter. The pistons will be coupled with a crankshaft (not shown) rotatable to provide torque for purposes of vehicle propulsion, operating a generator for production of electrical energy, or in still other applications such as operating a compressor, a pump, or various other types of equipment.

The internal combustion engine 102 is fueled by a first fuel 108 stored in a first fuel tank 110 and a second fuel 112 stored in a second fuel tank 114. The first fuel 108 may include a higher cetane/lower octane liquid fuel, and the second fuel 112 may include a lower cetane/higher octane liquid fuel. The terms "higher" and "lower" in this context may be understood as relative terms in relation to one another. Thus, the first fuel 108 may have a higher cetane number and a lower octane number than a cetane number and an octane number of the second fuel 112. The first fuel 108 might include a diesel distillate fuel, dimethyl ether, biodiesel, Hydrotreated Vegetable Oil (HVO), Gas to Liquid (GTL) renewable diesel, any of a variety of liquid fuels with a cetane enhancer, or still another fuel type. The second fuel 112 may include an alcohol fuel such as methanol or ethanol, for example, or still other fuel types such as, but not limited to, isopropyl alcohol, n-propyl alcohol, and t-butyl alcohol. For the purposes of FIG. 1, the first fuel 108 is described as diesel fuel and the second fuel 112 is described as methanol, though as noted above, the presently disclosed subject matter may be used with other fuel types.

In various examples, the first fuel 108 or the second fuel 112 is supplied to the internal combustion engine 102 through a mixing valve 116. The mixing valve 116 can receive the first fuel 108 from a first fuel pump 120. The first fuel pump 120 is in fluidic communication with the first fuel tank 110 and pumps the first fuel 108 into the mixing valve 116. The mixing valve 116 also receives the second fuel 112 from a second fuel pump 122. The second fuel pump 122 is in fluidic communication with the second fuel tank 114 and pumps the second fuel 112 from the second fuel tank 114 to the mixing valve 116. The mixing valve 116 is a proportional valve that receives the first fuel 108 and/or the second fuel 112 and, based on a position of the mixing valve 116, the mixing valve 116 outputs a ratio of the first fuel 108 to the second fuel 112. For example, the mixing valve 116 can be positioned to output only the first fuel 108 or the second fuel 112 or various ratios of the first fuel 108 to the second fuel 112 thereof. It should be noted that the presently disclosed subject matter is not limited to the manner in which the first fuel 108 and the second fuel 112 are combined (mixed), as other technologies may be used and are considered to be within the scope of the presently disclosed subject matter. Additionally, it should be noted that the use of a mixed fuel comprised of two or more fuels is merely for purposes of illustrating an example of the presently disclosed subject matter, as various examples of the presently disclosed subject matter can be used in systems in which the second fuel 112 is injected separately into the internal combustion engine 102 from another fuel, such as the first fuel 108.

The output of the mixing valve 116 enters fuel line 124, into feed lines 126A and 126B, and thereafter into fuel rails 128A and 128B. As used herein, a "rail" is a fuel line that supplies fuel to injectors (not shown) for combustion. It should be noted that the fuel rails 128A and 128B are illustrated as separate rails. In some examples, the fuel rails 128A and 128B are one or more rails that provide the first fuel 108, second fuel 112, or mixtures thereof, to the injectors. It should be further noted that internal combustion engine 102 may receive the output of the mixing valve 116 in manners different than the use of the fuel line 124, the feed lines 126A and 126B, and fuel rails 128A and 128B described in FIG. 1. Exhaust 130 exits the internal combustion engine 102.

In diesel fuel engines, "fuel NOx" in the exhaust 130 is formed by the reaction of nitrogen bound in the fuel with oxygen in the combustion air. The formation of fuel NOx is lower in gaseous fuels, but in fuel oil such as diesel fuel burn as they are injected, fuel NOx can account for up to 50% of the total NOx emissions. To reduce the amount of NOx in emissions from a diesel fuel engine, the internal combustion engine system 100 further includes selective catalytic reduction (SCR) system 132. The SCR system 132 is made from various porous ceramic materials used as a support, such as titanium oxide, and active catalytic components are usually either oxides of base metals (such as vanadium, molybdenum and tungsten), zeolites, or various precious metals. A reductant, typically anhydrous ammonia ($NH_3$), aqueous ammonia ($NH_4OH$), or a urea ($CO(NH_2)_2$) solution, is added to a stream of flue or exhaust gas and is reacted onto a catalyst. As the reaction drives toward completion, nitrogen ($N_2$), and carbon dioxide ($CO_2$), in the case of urea use, are produced. Based on the compounds entering the SCR system 132 and their respective stoichiometric ratios, the reduction reaction in the SCR system 132 proceeds at various rates, entering the atmosphere as SCR exhaust 133. Equation #1, below, represents a slow rate of a reduction reaction when the entering reactants are in the stoichiometric ratios indicated in Equation #1. Equation #2, below, represents a standard rate of a reduction reaction when the entering reactants are in the stoichiometric ratios indicated in Equation #2. Equation #3, below, represents a fast rate of reduction (fast SCR) reaction when the entering reactants are in the stoichiometric ratios indicated in Equation #3.

$$6NO_2 + 8NH_3 \leftrightarrow 7N_2 + 12H_2O \qquad (1)$$

$$4NO + 3O_2 + 4NH_3 \leftrightarrow 4N_2 + 6H_2O \qquad (2)$$

$$NO + NO_2 + 2NH_3 \leftrightarrow 2N_2 + 3H_2O \qquad (3)$$

Because of the rate of the reduction reaction, in some examples, a stoichiometric ratio allowing for Equation #3 may be preferable. The optimal stoichiometric ratio to achieve Equation #3 is when NO is in a 50/50 stoichiometric ratio with NO2, thus allowing the SCR system 132 to proceed with the fast SCR reaction. This "fast SCR" reaction plays a role at 180-300° C. in boosting the denitrification (de-NOx) performance. However, when using methanol or other similar alcohol fuels as the second fuel 112, the exhaust 130 of the internal combustion engine 102 can lead to a stoichiometric ratio that is not compliant with achieving the fast SCR reaction of Equation #3. When diesel is substituted with methanol (or another alcohol fuel) in a lean burn internal combustion engine, a majority of the NOx in the emissions is in the form of NO2. In some examples, the NO2 component of the NOx may be up to ninety percent (90%). As indicated above, if the higher NO2/NOx emissions are input into the SCR system 132, the rection rate will be lower and may require a higher levels of diesel exhaust fluid dosing rates.

To decrease the amount of NO2 in relation to the NO to move the stoichiometric ratio closer to the 50/50 ratio to achieve the fast SCR reaction, the internal combustion engine system 100 includes a diesel oxidation catalyst (DOC) 134. The DOC 134 receives the exhaust 130 from the internal combustion engine 102. The DOC 134 reduces at least a portion of NO2 in the exhaust 130 back to NO prior to entering the SCR system 132. In some examples, the DOC 134 is a monolith honeycomb substrate coated with a platinum group metal catalyst, packaged in a stainless-steel container. The honeycomb structure with many small parallel channels presents a high catalytic contact area to exhaust gasses. It should be understood that the presently disclosed subject matter is not limited to any particular structural configuration of the DOC 134.

In order to reduce the concentration of the NO2 in the exhaust to achieve the fast SCR reaction, the NO2 is first reduced to NO, and then, a portion of the reduced NO2 is oxidized back to NO2. For example, the NO2 to NO ratio may be 70/30 in the exhaust 130 entering the DOC 134. In the first stage of the DOC 134 process, the NO2 to NO ratio may change to 20/80, or in some instances, essentially 0/100 whereby all of the NO2 has been reduced to NO. However, as noted above, this ratio does not achieve the 50/50 ratio for the fast SCR reaction. Thus, a portion of the reduced NO2 (now NO) is oxidized back to NO2 in a second stage of the DOC 134 process. To achieve the first stage of reduction in the DOC 134, a reductant additive that is more reactive than NO2 is provided into the DOC 134 in the first stage. The additive can be composed of various compounds including, but not limited to, carbon monoxide (CO), methanol, diesel fuel, and the like. The presently disclosed subject matter is not limited to any particular additive that is more reactive than the NO2. During the first stage of the DOC 134 process, the NO2 from the exhaust 130 is adsorbed onto the precious metal catalyst of the DOC 134 and an atomic oxygen is removed from the NO2, reducing the NO2 to NO. Because of the higher reactivity of the additive, the additive scavenges a portion of the atomic oxygen from the catalyst. During the second stage of the DOC 134 process, the NO is oxidized over the catalyst to form NO2.

As noted above, to achieve the first stage of reducing the concentration of NO2, an additive 138 is provided to the exhaust 130 that is received by the DOC 134. The additive 138 can be one or more oxidants that are more reactive than NO2. In some examples, the additive 138 is carbon monoxide produced during combustion, a portion of the second fuel 112 that does not combust within the internal combustion engine 102, or combinations thereof added to the exhaust 130 prior to entering the DOC 134. For example, when the second fuel 112 is added to the internal combustion engine 102, a portion of the second fuel 112 may be uncombusted (unburned). The unburned second fuel 112 comprises a portion of the exhaust 130 and may be used as the additive 138 to reduce a portion of the NO2 in the first stage of the DOC 134 process. In another example, the additive 138 may be, either separately or in addition to other additives such as unburned second fuel 112, carbon monoxide produced as a combustion product. In still further examples, the additive 138 can be a reductant added to the exhaust 130. For example, the additive 138 can be a portion of the second fuel 112.

In examples in which the additive 138 is an unburned portion of the second fuel 112, the amount of the second fuel 112 provided to the internal combustion engine 102 can be controlled to effectuate a certain portion of the unburned second fuel 112 to be available for the first stage of NO2 reduction in the DOC 134. To control the amount of the second fuel 112 provided to the internal combustion engine 102, a controller 140 is provided. The controller 140 is a component of the internal combustion engine 102 engine control unit (ECU) or engine control module (ECM) that controls the amount of the mixed fuel and the mixture of the fuel between the first fuel 108 and the second fuel 112. The controller 140 is implemented by one or more processors having instructions stored in one or more memory devices that control the amount of fuel and mixture. To determine the amount of fuel of a mixture of fuels to provide the internal combustion engine 102 for a given power level as indicated by power signal 143 provided to the controller 140, the controller 140 has stored therein a fuel map 142. The fuel map 142 is a table in which for a given power level of the internal combustion engine 102, an amount of fuel and a particular mixture of fuels are provided to the controller 140. The fuel map 142 can be generated by testing the SCR exhaust 133 at various power levels and fuel mixtures to achieve the fast SCR reaction. For example, a detector 144 can be inserted into the SCR exhaust 133 to detect the amounts of water and nitrogen exiting in the SCR exhaust 133. The power levels of the internal combustion engine 102 can be varied along with the mixture between the first fuel 108 and the second fuel 112. The information provided by the detector 144 is used to generate the fuel map 142. The controller 140 uses the information provided by the detector 144 to adjust the amount of, and mixture of, the first fuel 108 and the second fuel 112 provided to the internal combustion engine 102 at various power levels.

For example, the fuel map 142 may indicate that for a power demand of twenty percent (20%) of the maximum power the internal combustion engine 102, the fast SCR reaction is achieved by adjusting the mixture of the first fuel 108 to the second fuel 112 to be 20% of the first fuel 108 to 80% of the second fuel 112. The controller 140 issues a mixing signal 150 to configure the mixing valve 116 to cause the output of the mixing valve 116 to be 80% of the second fuel 112 and 20% of the first fuel 108, by volumetric flow rate. To meet the volumetric flowrate to support the increase in power demand (and thus the amount of fuel used) indicated by the fuel map 142 for the power level, the controller 140 also issues pump signals 152A and 152B. The pump signal 152A is used to control the pump speed of the first fuel pump 120 and the pump signal 152B is used to control the pump speed of the second fuel pump 122. In this example, the controller 140 issues the pump signals 152A and 152B to increase the speed of the first fuel pump 120 and the second fuel pump 122, respectively. By controlling the pump speeds using pump signals 152A and 152, as well as the position of the mixing valve 116 using the mixing signal 150, the controller 140, using the fuel map 142, can help to achieve the fast SCR process by providing the reductant into the DOC 134 for the two-stage process of NO2 reduction and NO oxidation, illustrated in more detail in FIG. 2.

Figure 2:
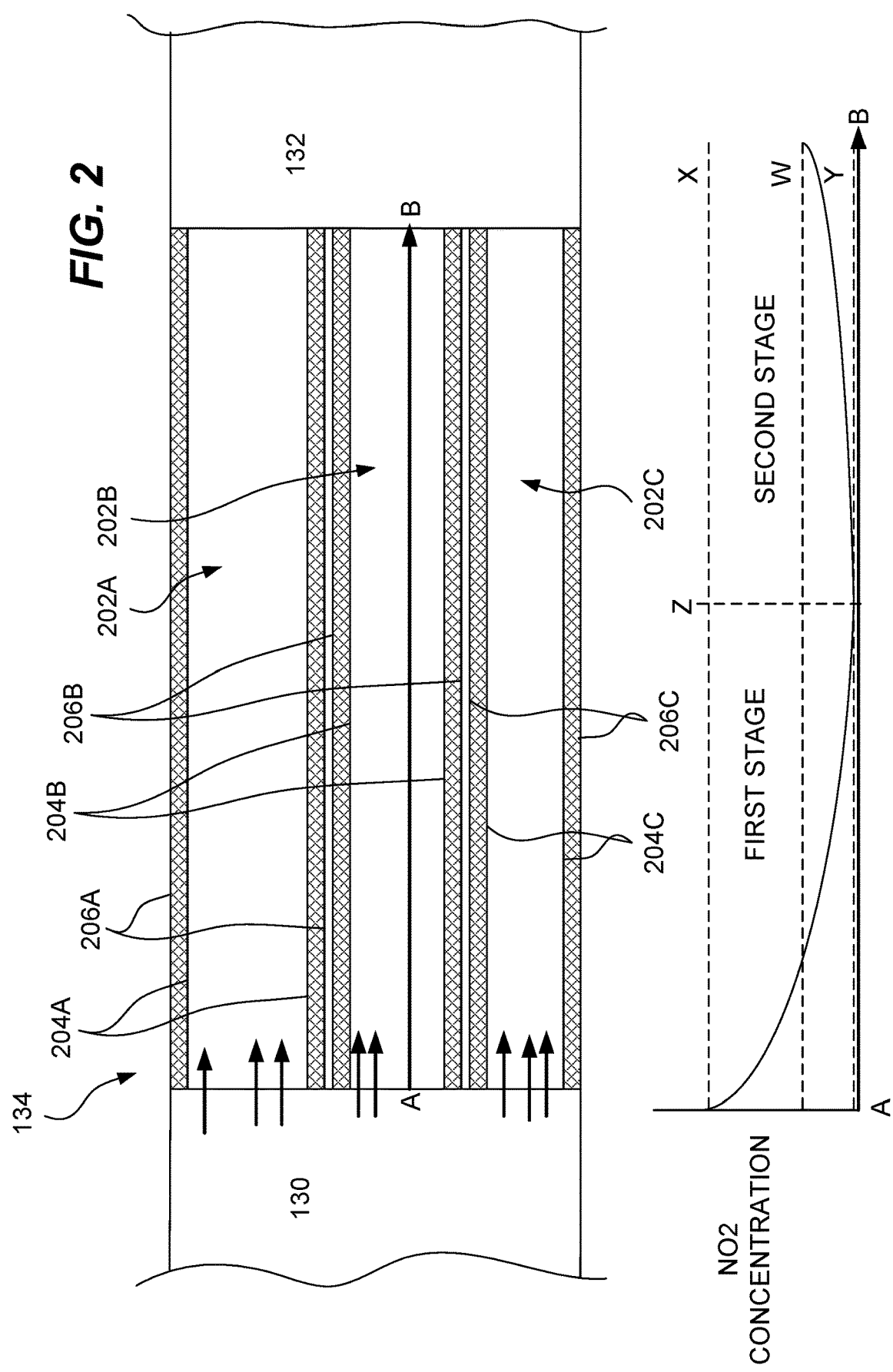
FIG. 2 is a diagram showing the change of concentration of NO2 as the NOx moves through a DOC, in accordance with various embodiments of the presently disclosed subject matter.

FIG. 2 is a diagram showing the change of concentration of NO2 as the NOx moves through the DOC 134, in accordance with various embodiments of the presently disclosed subject matter. As noted above, the controller 140 uses various signals to control one or more components of the internal combustion engine system 100. It should be noted that the controller 140 may have one or more additional inputs or outputs that are not illustrated, depending on the various uses of the controller 140. For example, the controller 140 may also have stored therein a fuel/air map that is used to control the air intake system of an internal combustion engine. The DOC 134 is formed from hollow tubes 202A, 202B, and 202C that allow the exhaust 130 to enter and flow within the tubes 202A, 202B, and 202C into the SCR system 132.

The hollow tubes 202A, 202B, and 202C include catalyst 204A, 204B, and 204C, respectively, installed within the hollow tubes 202A, 202B, and 202C. In some examples, the catalyst 204A, 204B, and 204C are deposited on inner surfaces 206A, 206B, and 206C of the hollow tubes 202A, 202B, and 202C, respectively. Table 1 of FIG. 2 illustrates generally the concentration changes of NO2 as the exhaust 130 moves through the DOC 134 from location A to location B along the AB direction. Location A represents the initial entry of the exhaust 130 into the DOC 134 and location B represents the exit of the exhaust 130 from the DOC 134 and into the SCR system 132. At location A, the concentration of NO2 in the exhaust 130 is X concentration. In some examples, the concentration of the NO2 at concentration X represents a stoichiometric ratio of NO2 to NO above a desired 50/50 ratio (meaning the concentration of NO2 is greater than NO in the exhaust 130). As the exhaust 130 moves from location A to location Z along the AB direction, the concentration of the NO2 decreases during the first stage. As noted above, during the first stage of the DOC 134 process, the NO2 from the exhaust 130 is adsorbed onto the precious metal catalyst 204A, 204B, and 204C of the DOC 134 whereby an atomic oxygen is removed from the NO2, thus reducing the NO2 to NO. Because of the higher reactivity of the additive 138, the additive 138 scavenges a portion of the atomic oxygen from the catalyst 204A, 204B, and 204C. In some examples, the concentration of the NO2 is reduced to concentration Y. In some further examples, the concentration Y is at or near zero percent (0%) depending on the amount of the additive 138 in the exhaust 130, as more additive 138 results in a greater rate of reduction of the NO2. From location Z to location B, a portion of the NO produced from the reduction of NO2 in the first stage is oxidized back to NO2 to a concentration W. As illustrated in FIG. 2, the concentration W is less than the concentration X. Preferably, to achieve the fast SCR reaction, the concentration W is at or near the concentration of NO entering the SCR system 132, giving the 50/50 stoichiometric ratio for the fast SCR reaction. It should be noted that the presently disclosed subject matter does not require equal concentrations of NO2 to NO. Ratios above or below the 50/50 ratio for the fast SCR may result in a portion of the NO2 or NO being left unreacted in the SCR system 132 or move through one of the other SCR processes illustrated by Equations #1 or #2, above.

These ratios are achieved using the controller 140, as described in FIG. 1. The controller 140 uses the fuel map 142 to determine fuel mixtures or the amount of the additive 138 to add to achieve the reduction and oxidation ratios illustrated in FIG. 2. However, in some examples, it may be preferable or desirable to implement the detector 144 as an in situ device to provide NO2 concentration levels during the operation of the internal combustion engine 102, the process of which is described in FIG. 3, below.

Figure 3:
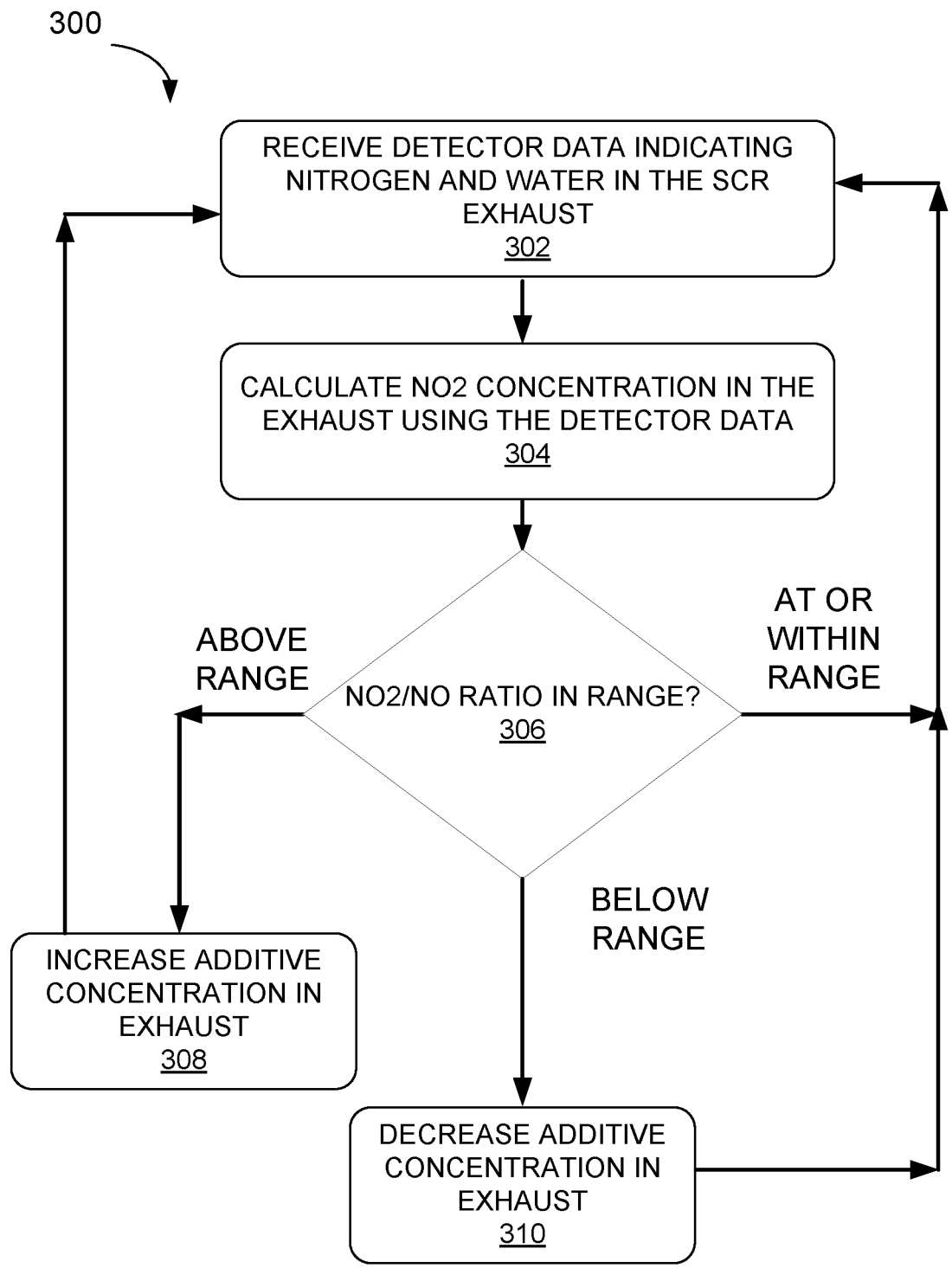
FIG. 3 illustrates a method for operating an internal combustion engine in which a controller uses a detector to control the amount of NO2 entering the SCR, in accordance with various examples of the presently disclosed subject matter.

FIG. 3 illustrates a method 300 for operating the internal combustion engine 102 in which the controller 140 uses the detector 144 to control the amount of NO2 entering the SCR system 132, in accordance with various examples of the presently disclosed subject matter. The method 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 300 commences at step 302, where the controller 140 receives data from the detector 144 indicating the amount of nitrogen and water in the SCR exhaust 133. The detector 144 is an in-situ component of the internal combustion engine system 100, meaning that the detector 144 takes readings of various components of the SCR exhaust 133 to provide that information to the controller 140 to determine the NO2/NO ratio of the exhaust 130. The detector 144 can be used in other manners to indicate the NO2/NO ratio of the exhaust 130. For example, the detector 144 can be placed in the stream of the exhaust 130 and detect the NO2 and NO directly. The presently disclosed subject matter is not limited to any specific location or manner in which the NO2/NO ratio of the exhaust 130 is determined. For example, a NOx sensor may be used in lieu of performing steps 302 and 304. Roughly 70% of the exhaust can be nitrogen since there is typically excess air fed into a cylinder. Additionally, there is typically 5-10% water vapor in the exhaust since water vapor is typically an in-cylinder combustion by-product. NOx can be typically on the order of 1,000 ppm, so the nitrogen and water formed from the SCR reactions would also be on the order of 1,000-1,500 ppm. In some examples, a NOx sensor can be used to provide information about the NOx conversion taking place on the SCR.

At step 304, the controller 140 calculates the NO2 concentration in the exhaust. The calculation is determined based on the manner in which the detector 144 is installed. If the detector is installed to detect the NO2 and NO in the exhaust 130, the controller 140 compares the concentration of the NO2 to the NO to determine if the ratio of the NO2/NO is within a range (discussed in step 306, below). If the detector 144 is installed in another location such as the SCR exhaust 133, the controller 140 can use the concentrations of nitrogen and oxygen to determine the initial concentrations of NO2 and NO.

At step 306, the controller 140 determines if the NO2/NO ratio is within a range suitable for supporting the fast SCR reaction. While in some examples, it may be preferable to achieve and maintain a 50/50 ratio of NO2 to NO for the fast SCR reaction. However, in other examples, it may be preferable or necessary to maintain the ratio of NO2 to NO within a range, whereby a relatively small portion of the NO2 reacted in the SCR system 132 moves through via equation #1, and the remaining, relatively larger portion of the NO2 reacted in the SCR system 132 moves through via the fast SCR reaction of equation #3. Although the range may be based on acceptable emission standards, in some examples, the range of the ratio may be from 30/60 NO2 to NO to 60/30 NO2 to NO.

If at step 306 the controller 140 determines the calculated range of NO2 to NO is within the accepted range, the method 300 continues to step 302, where the controller 140 receives a second set of data from the detector 144.

If at step 306 the controller 140 determines the calculated range of NO2 to NO is above the accepted range, meaning the NO2 concentration is greater than the NO concentration resulting in a ratio above the accepted range, the method 300 continues to step 308, where the controller 140 increases the additive 138 concentration in the exhaust 130. Increasing the concentration of the additive 138 in the exhaust 130 facilitates the two-stage process of NO2 reduction in the DOC 134 described in FIG. 2, above. In some examples, the controller 140 issues mixing signal 150 to increase the percentage of the second fuel 112 in the fuel line 124. The controller 140 can use the fuel map 142 to determine how much to increase the percentage of the second fuel 112 in the fuel line 124. In other examples, the controller 140 can increase the percentage of the second fuel 112 in the fuel line 124 in increments. For example, the controller 140 can issue the mixing signal 150 to increase the percentage of the second fuel 112 by five percent (5%) in the fuel line 124 and then retest by receiving a second set of data from the detector 144 after the fuel mixture change. 5% is merely an example, as the percentage change of the second fuel 112 may vary depending on the configuration of the internal combustion engine 102. Thus, the method 300 thereafter continues to step 302, where the controller 140 receives a second set of data from the detector 144.

If at step 306 the controller 140 determines the calculated range of NO2 to NO is below the accepted range, meaning the NO2 concentration is less than the NO concentration resulting in a ratio below the accepted range, the method 300 continues to step 310, where the controller 140 decreases the additive 138 concentration in the exhaust 130. Decreasing the concentration of the additive 138 in the exhaust 130 facilitates the two-stage process of NO2 reduction in the DOC 134 described in FIG. 2, above and reduces the amount of the additive that is unused, saving fuel. In some examples, the controller 140 issues mixing signal 150 to decrease the percentage of the second fuel 112 in the fuel line 124. The controller 140 can use the fuel map 142 to determine how much to decrease the percentage of the second fuel 112 in the fuel line 124. In other examples, the controller 140 can decrease the percentage of the second fuel 112 in the fuel line 124 in increments. For example, the controller 140 can issue the mixing signal 150 to increase the percentage of the second fuel 112 in the fuel line 124 by five percent (5%) and then retest by receiving a second set of data from the detector 144 after the fuel mixture change. 5% is merely an example, as the percentage change of the second fuel 112 may vary depending on the configuration of the internal combustion engine 102. Thus, the method 300 thereafter continues to step 302, where the controller 140 receives a second set of data from the detector 144.

Figure 4:
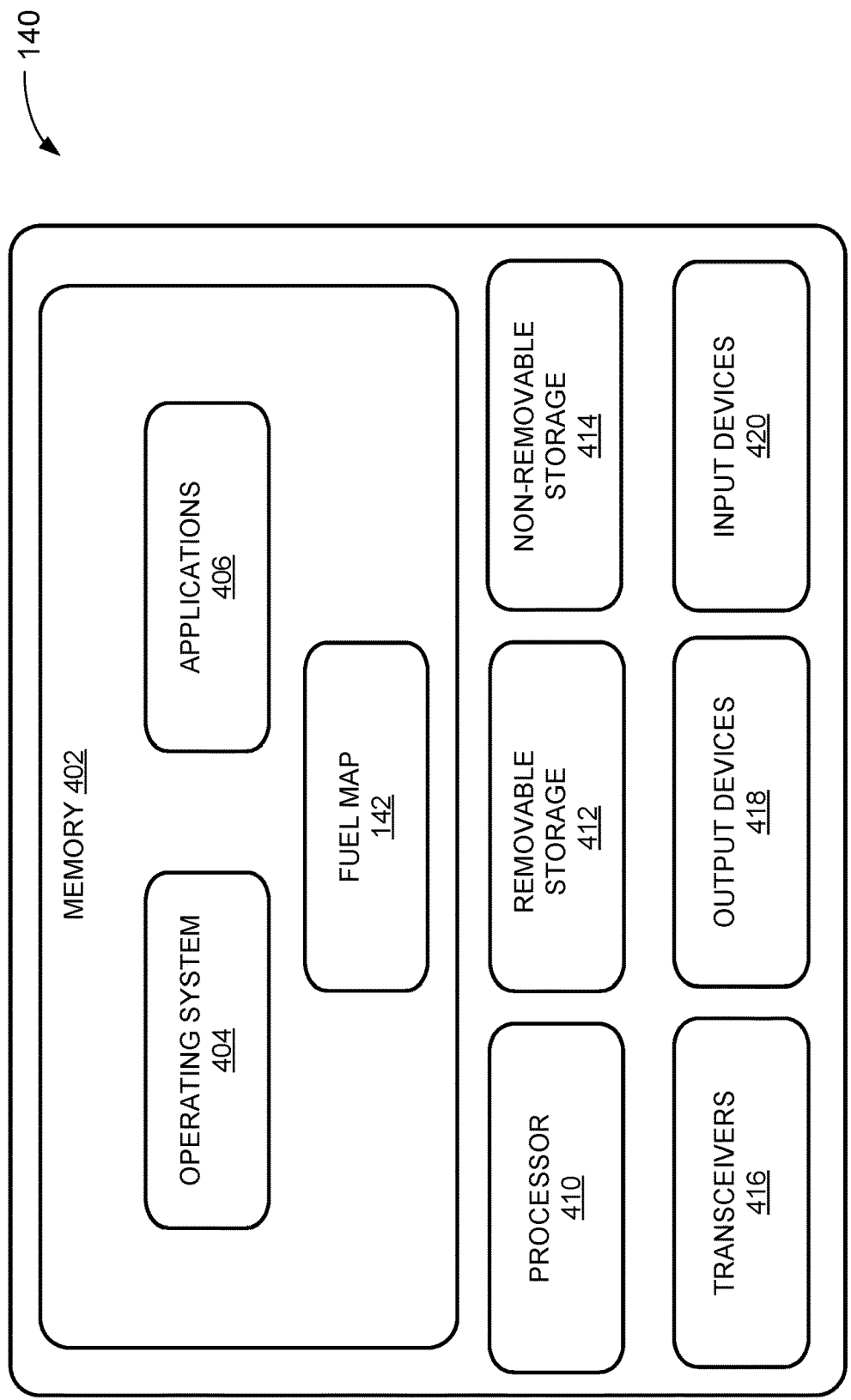
FIG. 4 depicts a component level view of a controller for use with the systems and methods described herein, in accordance with various examples of the presently disclosed subject matter.

FIG. 4 depicts a component level view of the controller 140 for use with the systems and methods described herein, in accordance with various examples of the presently disclosed subject matter. The controller 140 could be any device capable of providing the functionality associated with the systems and methods described herein. The controller 140 can comprise several components to execute the above-mentioned functions. The controller 140 may be comprised of hardware, software, or various combinations thereof. As discussed below, the controller 140 can comprise memory 402 including an operating system (OS) 404 and one or more standard applications 406. The standard applications 406 may include applications that provide for receiving and calculating the modified flowrates, the concentration of water in the second fuel 112, and the like.

The controller 140 can also comprise one or more processors 410 and one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two. The memory 402 can include data pertaining to the fuel map 142, power signals 143, and other information, and can be stored on a remote server or a cloud of servers accessible by the controller 140.

The memory 402 can also include the OS 404. The OS 404 varies depending on the manufacturer of the controller 140. The OS 404 contains the modules and software that support basic functions of the controller 140, such as scheduling tasks, executing applications, and controlling peripherals. The OS 404 can also enable the controller 140 to send and retrieve other data and perform other functions, such as transmitting control signals using the transceivers 416 and/or output devices 418 and receiving signals using the input devices 420.

The controller 140 can also comprise one or more processors 410. In some implementations, the processor(s) 410 can be one or more central processing units (CPUs), graphics processing units (GPUs), both CPU and GPU, or any other combinations and numbers of processing units. The controller 140 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 140. Any such non-transitory computer-readable media may be part of the controller 140 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the controller 140 and a wireless modem that is a gateway to the Internet), the Internet, and/or an intranet. Specifically, the transceiver(s) 416 can include one or more transceivers that can enable the controller 140 to send and receive data. Thus, the transceiver(s) 416 can include multiple single-channel transceivers or a multi-frequency, multi-channel transceiver to enable the controller 140 to send and receive video calls, audio calls, messaging, etc. The transceiver(s) 416 can enable the controller 140 to connect to multiple networks including, but not limited to 2G, 3G, 4G, 5G, and Wi-Fi networks. The transceiver(s) 416 can also include one or more transceivers to enable the controller 140 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver(s) 416 can enable the controller 140 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

INDUSTRIAL APPLICABILITY

The present disclosure relates generally to emission controls for internal combustion engines, primarily diesel fuel engines that use a fuel such as methanol as a substitute fuel for all or a portion of the diesel fuel. The use of methanol (or other fuels similar to methanol) in a diesel engine can cause the NO2 levels in the exhaust to increase to a concentration that a fast SCR reaction in an SCR is difficult to achieve. In order to maintain the ratio of NO2 to NO in the exhaust of the engine to provide for a higher probability of achieving a fast SCR reaction in an SCR, examples of the presently disclosed subject matter use a DOC prior to the exhaust gases entering the SCR. In a conventional configuration, the DOC oxidizes NO to NO2. However, if the NO2 concentration is already above the desired level for a fast SCR reaction, the increase of NO2 in a conventional DOC configuration would further exacerbate the issue. Therefore, in examples of the presently disclosed subject matter, an additive is used to significantly reduce the concentration of NO2, and thereafter allowing the DOC to increase the concentration of NO2 to a lower level in a two-stage process. The additive can be unburned (non-combusted) second fuel (such as methanol) that is present after combustion. Other examples include changing the first fuel/second fuel mixture to increase the amount of the second fuel to cause some of the second fuel to go uncombusted in a cylinder. Other additives include CO as well as the diesel fuel itself. The NO2 to NO ratio is preferably maintained in a range to facilitate the fast SCR reaction desirable in an emission control system.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An internal combustion engine system, comprising:
    an internal combustion engine configured to combust diesel fuel and a second fuel, wherein a portion of an exhaust of the combustion engine comprises nitrogen dioxide (NO2) and nitric oxide (NO);
    a diesel oxidation catalyst (DOC) configured to receive the exhaust of the internal combustion engine and, in a first stage, decrease a concentration of the NO2 at a first concentration to a second concentration using an additive and reducing a portion of the NO2 to NO and, in a second stage, increase the concentration of the NO2 from the second concentration to a third concentration by oxidizing a portion of the NO to NO2, wherein the third concentration of the NO2 is less than the first concentration; and
    a selective catalytic reduction (SCR) system configured to receive the NO2 and NO from the DOC and react the NO2 and NO with anhydrous ammonia (NH3) to produce nitrogen and water as an emission from the internal combustion engine system.

2. The internal combustion engine system of claim 1, wherein the second fuel comprises methanol, ethanol, n-propyl alcohol, isopropyl alcohol, or t-butyl alcohol.

3. The internal combustion engine system of claim 1, further comprising a controller comprising:
    a memory storing computer-executable instructions; and
    a processor in communication with the memory, the computer-executable instructions causing the processor to perform acts comprising:
        receiving data from a detector measuring an exhaust gas;
        calculating the concentration of the NO2 in the exhaust gas;

determining if a ratio of the NO2 to NO is within a range; and
    upon determining that the ratio of the NO2 to NO is above the range, increasing an amount of the additive;
    upon determining that the ratio of the NO2 to NO is at or within the range, maintaining the amount of the additive; or
    upon determining that the ratio of the NO2 to NO is below the range, decreasing the amount of the additive.

4. The internal combustion engine system of claim 3, wherein the computer-executable instructions to cause the processor to perform the act comprising increasing an amount of the additive comprises computer-executable instruction to cause the processor to perform the acts comprising:

issuing a mixing signal to increase a percentage of the additive;
    receiving a second data from the detector;
    determining, using the second data, that the ratio of the NO2 to NO is at or within the range; and
    maintaining the amount of the additive.

5. The internal combustion engine system of claim 3, wherein the computer-executable instructions to cause the processor to perform the act comprising decreasing an amount of the additive comprises computer-executable instruction to cause the processor to perform the acts comprising:

issuing a mixing signal to decrease a percentage of the additive;
    receiving a second data from the detector;
    determining, using the second data, that the ratio of the NO2 to NO is at or within the range; and
    maintaining the amount of the additive.

6. The internal combustion engine system of claim 1, wherein the DOC comprises a monolith honeycomb substrate coated with a platinum group metal catalyst.

7. The internal combustion engine system of claim 1, wherein the additive comprises carbon monoxide, diesel fuel, or methanol.

* * * * *